United States Patent
Kostakis

(10) Patent No.: US 12,248,749 B1
(45) Date of Patent: Mar. 11, 2025

(54) CONTENT UPDATE BY MERGING OF MARKUP LANGUAGE DOCUMENTS

(71) Applicant: Bentley Systems, Incorporated, Exton, PA (US)

(72) Inventor: Georgios Kostakis, Boston (GB)

(73) Assignee: Bentley Systems, Incorporated, Exton, PA (US)

( * ) Notice: Subject to any disclaimer, the term of this patent is extended or adjusted under 35 U.S.C. 154(b) by 135 days.

(21) Appl. No.: 17/706,029

(22) Filed: Mar. 28, 2022

(51) Int. Cl.
    *G06F 17/00*     (2019.01)
    *G06F 40/151*     (2020.01)
    *G06F 40/166*     (2020.01)

(52) U.S. Cl.
    CPC ......... *G06F 40/151* (2020.01); *G06F 40/166* (2020.01)

(58) Field of Classification Search
    CPC .............................. G06F 40/151; G06F 40/166
    USPC ......................................................... 715/234
    See application file for complete search history.

(56) References Cited

U.S. PATENT DOCUMENTS

| | | | |
|---|---|---|---|
| 7,100,109 B1* | 8/2006 | Chartier | G06F 16/9566 707/E17.115 |
| 7,168,035 B1* | 1/2007 | Bell | G06F 40/143 715/745 |
| 7,284,199 B2* | 10/2007 | Parasnis | G06F 40/174 715/201 |
| 8,423,518 B2 | 4/2013 | Lafontaine et al. | |
| 8,635,242 B2* | 1/2014 | Lim | G06F 16/835 707/769 |
| 2006/0181531 A1* | 8/2006 | Goldschmidt | H04L 41/22 345/440 |
| 2007/0124667 A1* | 5/2007 | Patrick | G06F 40/143 707/999.001 |

(Continued)

FOREIGN PATENT DOCUMENTS

| CN | 113342321 A | * 9/2021 |
|---|---|---|
| CN | 115169292 A | * 10/2022 |

OTHER PUBLICATIONS

Cone, Matt, "The Markdown Guide," Aug. 2019, pp. 1-62.

(Continued)

*Primary Examiner* — Laurie A Ries
(74) *Attorney, Agent, or Firm* — Cesari and McKenna, LLP; James A. Blanchette

(57) ABSTRACT

In various example embodiments, techniques are provided for updating content of a markup language document. A software process receives a markup language document having one or more sections and a corresponding enhancement document that includes a plurality of commands describing updates to the markup language document. The software process converts the markup language document into a first hierarchical graph in which each section of the markup language document is arranged as a parent of any subsections of the respective section. The software process also converts the enhancement document into a second hierarchical graph including one or more of the commands. The software process merges the first hierarchical graph and the second hierarchical graph, the merging to apply commands of the second hierarchical graph to the first hierarchical graph to produce an updated hierarchical graph. The software process then outputs an updated markup language document based on the updated hierarchical graph.

20 Claims, 5 Drawing Sheets

```
┌─510─────────────┬─520────────────┬─530──────────────────────────────────────┐
│ # Header 1       │ Header 1        │ Header : {Type: Composite, Value: Header 1} │
│ Text 1           │                 │ +-- Content: {Type: Text, Value: Text 1 My New Text} │
│ My New Text      │ Text 1          │ +-- Header {Type: Composite, Value: Header 1.1} │
│                  │ My New Text     │ |   +-- Content {Type: Text, Value: Text 1.1} │
│ ## Header 1.1    │                 │ +-- Header {Type: Composite, Value: Header 1.1.1} │
│ Text 1.1         │ Header 1.1      │ |   +-- Content {Type: Text, Value: This is a new Header} │
│                  │                 │ +-- Header {Type: Composite, Value: Header 1.2} │
│ # Header 1.1.1   │ Text 1.1        │ |   +-- Content {Type: Text, Value: Text 1.2 Some additional info} │
│ This is a new Header │             │ |   |   +-- Header {Type: Composite, Value: Header 1.2.1} │
│ ## Header 1.2    │ Header 1.1.1    │ |       +-- Content {Type: Text, Value: Supported Commands │
│ Text 1.2         │ This is a new Header │                            #appendTo:: │
│                  │                 │ |                                #insertBefore:: │
│ Some additional info │ Header 1.2  │ |                                #replace:: │
│                  │                 │ |                                #delete::} │
│ ### Header 1.2.1 │ Text 1.2        │ +-- Header {Type: Composite, Value: New Header 1.3} │
│ Supported Commands │                │    +-- Content {Type: Text, Value: New Text 1.3} │
│ #appendTo::      │ Some additional info │ │
│ #insertBefore::  │                 │                                              │
│ #replace::       │ Header 1.2.1    │                                              │
│ #delete::        │                 │                                              │
│                  │ Supported Commands │                                           │
│ ### Header 1.2.1 │ #appendTo:      │                                              │
│ Text 1.2.1       │ #insertBefore:: │                                              │
│                  │ #replace::      │                                              │
│ ## New Header 1.3 │ #delete::      │                                              │
│ New Text 1.3     │                 │                                              │
│                  │ Header 1.2.1    │                                              │
│                  │                 │                                              │
│                  │ Text 1.2.1      │                                              │
│                  │                 │                                              │
│                  │ New Header 1.3  │                                              │
│                  │                 │                                              │
│                  │ New Text 1.3    │                                              │
└──────────────────┴─────────────────┴──────────────────────────────────────────┘
```

(56) References Cited

U.S. PATENT DOCUMENTS

| | | | | |
|---|---|---|---|---|
| 2014/0281873 A1* | 9/2014 | Frew | ................... | G06F 16/00 |
| | | | | 715/229 |
| 2015/0169521 A1* | 6/2015 | Leventhal | ............. | G06F 40/103 |
| | | | | 715/234 |
| 2021/0264096 A1* | 8/2021 | Huang | ................... | G06F 40/14 |

OTHER PUBLICATIONS

"Ruby on Rails 6.1 Release Notes," Rails Guides, V7.0.2.3, <https://guides.rubyonrails.org/6_1_release_notes.html>, Dec. 2020, pp. 1-7.
White, Lukas, "Writing API Documentation with Slate," SitePoint Pty. Ltd., sitepoint, <https://www.sitepoint.com/writing-api-documentation-slate/>, Dec. 12, 2014, pp. 1-13.

* cited by examiner

```
510                              520                                      530

# Header 1                       Header 1                                 Header : (Type: Composite, Value: Header 1)
Text 1                           Text 1                                   +-- Content: (Type: Text, Value: Text 1 My New Text)
My New Text                      My New Text                              +-- Header (Type: Composite, Value: Header 1.1)
                                                                          |   +-- Content (Type: Text, Value: Text 1.1)
Header 1.1                    Header 1.1                               |   +-- Header (Type: Composite, Value: Header 1.1.1)
Text 1.1                         Text 1.1                                 |       +-- Content (Type: Text, Value: This is a new Header)
                                                                          +-- Header (Type: Composite, Value: Header 1.2)
#Header 1.1.1                    Header 1.1.1                             |   +-- Content (Type: Text, Value: Text 1.2 Some additional info)
This is a new Header             This is a new Header                     |   +-- Header (Type: Composite, Value: Header 1.2.1)
                                                                          |       +-- Content (Type: Text, Value: Supported Commands
Header 1.2                    Header 1.2                               |                    #appendTo:
Text 1.2                         Text 1.2                                 |                    #insertBefore::
Some additional info             Some additional info                     |                    #replace::
                                                                          |                    #delete::)
Header 1.2.1                 Header 1.2.1                             +-- Header (Type: Composite, Value: New Header 1.3)
Supported Commands               Supported Commands                           +-- Content (Type: Text, Value: New Text 1.3)
'#appendTo:`                     #appendTo:
'#insertBefore::`                #insertBefore::
'#replace::`                     #replace::
'#delete::`                      #delete::

Header 1.2.1                 Header 1.2.1
Text 1.2.1                       Text 1.2.1

New Header 1.3               New Header 1.3
New Text 1.3                     New Text 1.3
```

FIG. 5

CONTENT UPDATE BY MERGING OF MARKUP LANGUAGE DOCUMENTS

BACKGROUND

Technical Field

The present disclosure relates generally to markup languages and more specifically to techniques for updating content of markup language documents.

Background Information

A markup language is a text-encoding that includes a set of symbols that are inserted into a document to control its structure, formatting, and/or the relationships between its parts. Such markup symbols are interpreted by software to control how the markup language document should look when rendered (e.g., displayed on a display screen or printed on a printer). There are various classes of markup languages. One class of markup languages is commonly referred to as lightweight markup languages (LMLs) and is designed to have relatively simple, unobtrusive syntax such that the markup language documents are easily human-readable in raw form in addition to in their eventual rendered form. One popular LML is Markdown. Markup language documents written in Markdown (i.e. Markdown documents) commonly use the .md or .markdown file extension.

While markup languages (including Markdown) are commonly used in a variety of tasks, one common task is in the generation of software documentation, for example, application program interface (API) documentation. In such a task, a markup language document may be auto-generated from an API definition or the API code itself. The auto-generated markup language document may include sections and subsections (i.e. groupings and subgroupings of text having a header or subheader) that describe available endpoints and operations on each endpoint, parameters for input and output of each operation, authentication methods, and other aspects of the API. Given the size and complexity of some APIs (e.g., 1000+ endpoints each with their own operations and parameters), the resulting markup language document may be quite large (e.g., 1000+ sections). This large markup language document may be directly rendered, or may be converted into a website using a web application framework (e.g., Ruby on Rails) that automatically provides default structures for web pages and services.

While auto-generated markup language documents (such as those used as API documentation) may be quite useful, they often can be improved upon with human curation. To this end, it is desirable for users (e.g., content authors) to review auto-generated markup language documents and exert manual control, updating them to add new content, to modify existing content, or to remove existing content. The resulting human-updated markup language document may improve accuracy, completeness or other desirable properties.

However, it may be difficult for users (e.g., content authors) to manually control the content of large auto-generated markup language documents (such as those in API documentation). Often, such manual control has involved editing content of the auto-generated markup language document itself in a document editor. The user may need to wade through large amounts of content to make the desired updates. Further, auto-generated markup language documents may change repeatedly (e.g., on every build), requiring edits to be repeated. The result is that with traditional techniques exerting manual control over auto-generated markup language documents is generally extremely time consuming and error prone.

Accordingly, there is a need for improved techniques for updating content of markup language documents, for example, large auto-generated markup language documents (such as those used in API documentation).

SUMMARY

In various example embodiments, techniques are provided for updating content of markup language documents by merging content of the markup language documents (e.g., auto-generated markup language documents) with enhancement documents (e.g., user-content documents) that specify updates (e.g., user-specified updates). The updates in the enhancement documents may override the content of the original markup language documents to append, insert, delete or replace content as desired. The enhancement documents may be more compact than the original markup language documents, as they only focus on changed content. Further, the enhancement documents may be remerged with the markup language documents if/when the markup language documents change (e.g., upon each rebuild of auto-generated markup language documents) thereby avoiding the need to repeatedly specify the updates indicated therein.

In one example embodiment, a markup language merge software process executing on one or more computing devices receives a markup language document having one or more sections and a corresponding enhancement document that includes a plurality of commands describing updates to the markup language document. The software process converts the markup language document into a first hierarchical graph in which each section of the markup language document is arranged as a parent of any subsections of the respective section. The software process also converts the enhancement document into a second hierarchical graph including one or more of the commands. The software process merges the first hierarchical graph and the second hierarchical graph, the merging to apply commands of the second hierarchical graph to the first hierarchical graph to produce an updated hierarchical graph. The software process then outputs an updated markup language document based on the updated hierarchical graph.

It should be understood that a variety of additional features and alternative embodiments may be implemented other than those example embodiments discussed in this Summary. This Summary is intended simply as a brief introduction to the reader for the further description which follows and does not indicate or imply that the example embodiments mentioned herein cover all aspects of the disclosure, or are necessary or essential aspects of the disclosure.

BRIEF DESCRIPTION OF THE DRAWINGS

The description below refers to the accompanying drawings of example embodiments, of which:

FIG. 5 is an example update markup language document, rendered view and updated hierarchical graph that may be referred to as illustration of outputs of the steps of FIG. 2

DETAILED DESCRIPTION

Figure 1:
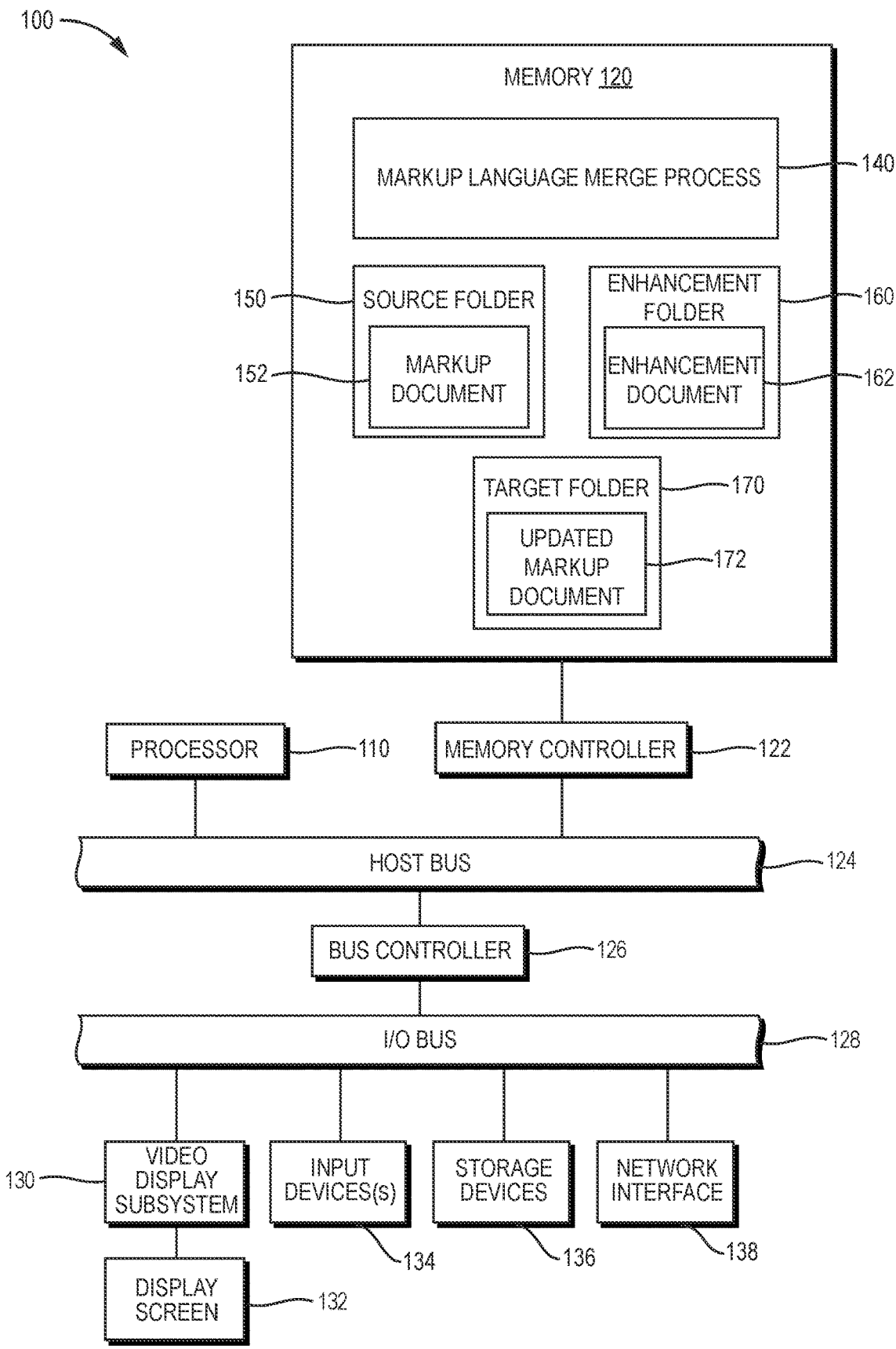
FIG. 1 is a block diagram of an example computing device that may be used with the present techniques.

FIG. 1 is a block diagram of an example computing device 100 that may be used with the present techniques. The computing device 100 includes at least one processor 110 coupled to a host bus 124. The processor 110 may be any of a variety of commercially available processors. A memory 120, such as a Random-Access Memory (RAM), is also coupled to the host bus 124 via a memory controller 122. When in operation, the memory 120 stores executable instructions and data that are provided to the processor 110. An input/output (I/O) bus 128 is accessible to the host bust 124 via a bus controller 126. A variety of additional components are coupled to the I/O bus 128. For example, a video display subsystem 130 is coupled to the I/O bus 128. The video display subsystem 130 may include a display screen 132 and hardware to drive the display screen. At least one input device 134, such as a keyboard, a touch sensor, a touchpad, a mouse, etc., is also coupled to the I/O bus 128. Storage device(s) 136, such as a hard disk drive, a solid-state drive, or other type of persistent data store, are further attached and may persistently store the executable instructions and data, which are loaded into the memory 120 when needed. Still further, a network interface 138 is coupled to the I/O bus 128. The network interface 138 enables communication over a computer network, such as the Internet, between the computing device 100 and other devices, using any of a number of well-known networking protocols. Such communication may enable collaborative, distributed, or remote computing with functionality spread across multiple computing devices.

Working together the components of the computing device 100 (and other computing devices in the case of collaborative, distributed, or remote computing) may execute instructions for a markup language merge software process 140. In general, the markup language merge software process 140 may update content of a markup language document 152 stored in a source folder 150 by merging its content with an enhancement document 162 stored in an enhancement folder 160 to produce an updated markup language document 172 in a target folder 170. The markup language merge software process 140 may be a stand-alone executable, for example, executed as a command-line tool, or may be part of a larger software environment, for example, a text-temple embedded in an integrated development environment, such as the Microsoft Visual Studio® development environment. The markup language document 152 may be an auto-generated markup language document having sections that are programmatically created by a software process (not shown) from underlying data. For example, the markup language document 152 may be API documentation auto-generated from an API definition or API code that includes sections and subsections that describe available endpoints and operations on each endpoint, parameters for input and output of each operation, authentication methods, and other aspects of the API. The enhancement document 162 may include standard markup language content as well as special commands. The commands may each include an instruction describing an operation to be performed (e.g., append, insert, delete, replace) and in some cases a reference describing where the instruction should be performed and content that is used in such operation. The enhancement document 162 may be a user-content document that includes standard markup language content and special commands that describe user-specified updates. The updated markup language document 170 may represent a result of user-specified updates applied to an auto-generated markup language document to enable manual control of the content. The documents 152, 162, 172 may be specified according to any of a variety of markup languages. In one embodiment, the documents 152, 162, 172 are specified according to the Markdown language.

Figure 2:
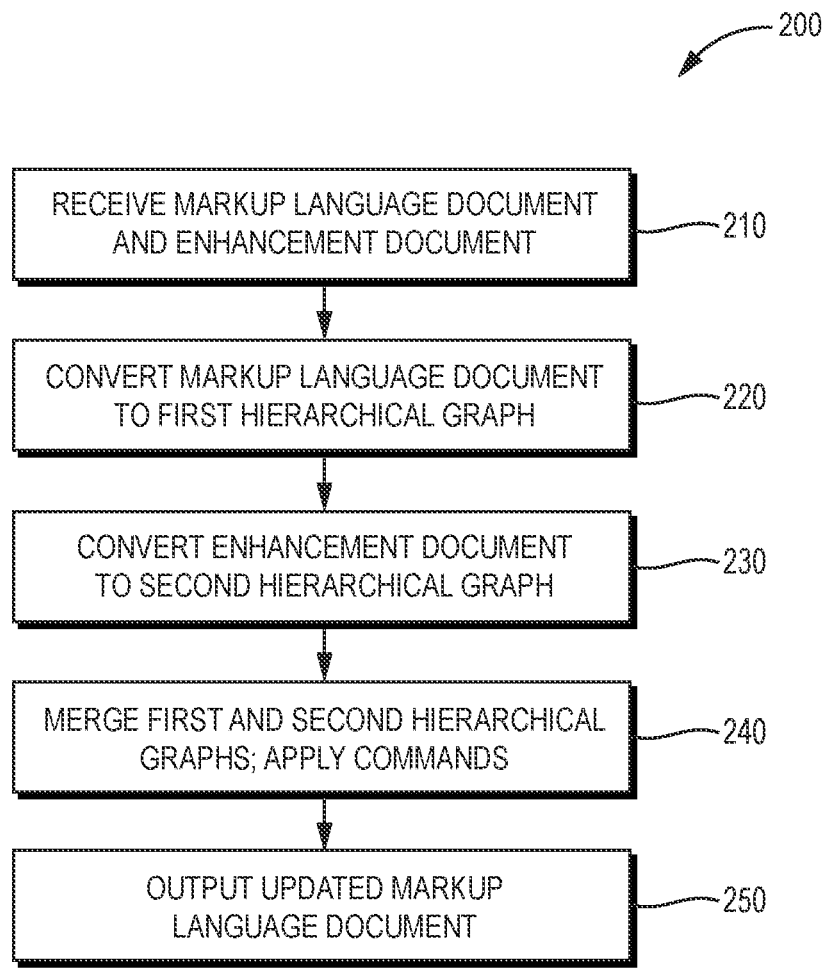
FIG. 2 is a flow diagram of an example sequence of steps that may be executed by a markup language merge software process to update content of a markup language document.

FIG. 2 is a flow diagram of an example sequence of steps that may be executed by a markup language merge software process 140 to update content of a markup language document 152. At step 210, the markup language merge software process 140 receives the markup language document 152 and the enhancement document 162, for example, by accessing them in the source folder 150 and the enhancement folder 160, respectively.

Figure 3:
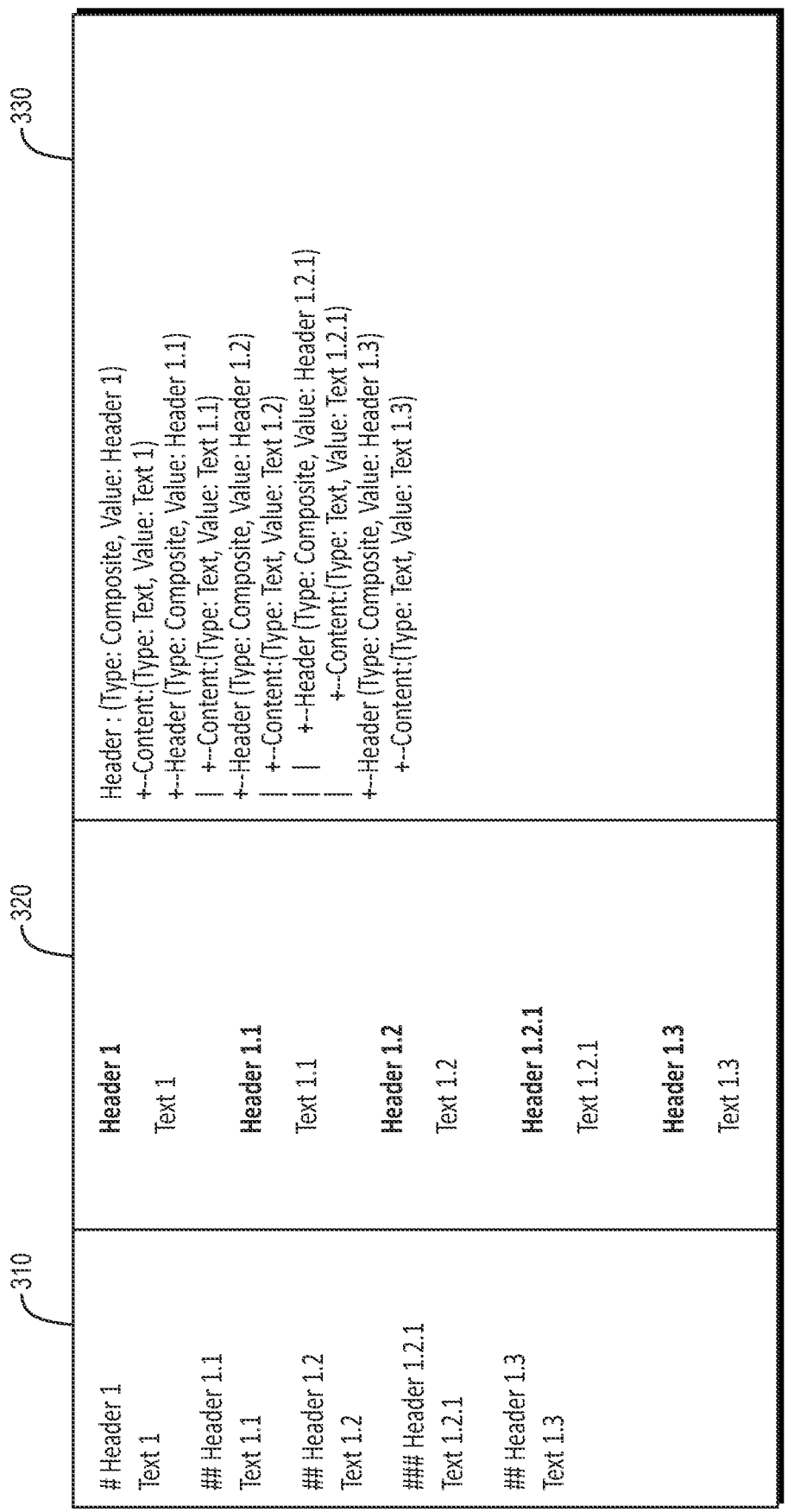
FIG. 3 is an example markup language document, rendered view and first hierarchical graph that may be referred to as illustrations of various ones of the steps of FIG. 2

Referring to FIG. 3, column 310 shows an example markup language document 152 (here a Markdown document) that may be received by the markup language merge software process 140 as part of step 210. In this example, the markup language document 152 includes five sections and subsections having headers ("Header 1", "Header 1.1", "Header 1.2", "Header 1.2.1" and "Header 1.3") and text ("Text 1", "Text 1.1", "Text 1.2", "Text 1.2.1" and "Text 1.3"). Column 320 shows how the example markup language document from column 310 would look when rendered (e.g., displayed on a display screen or printed on a printer).

Figure 4:
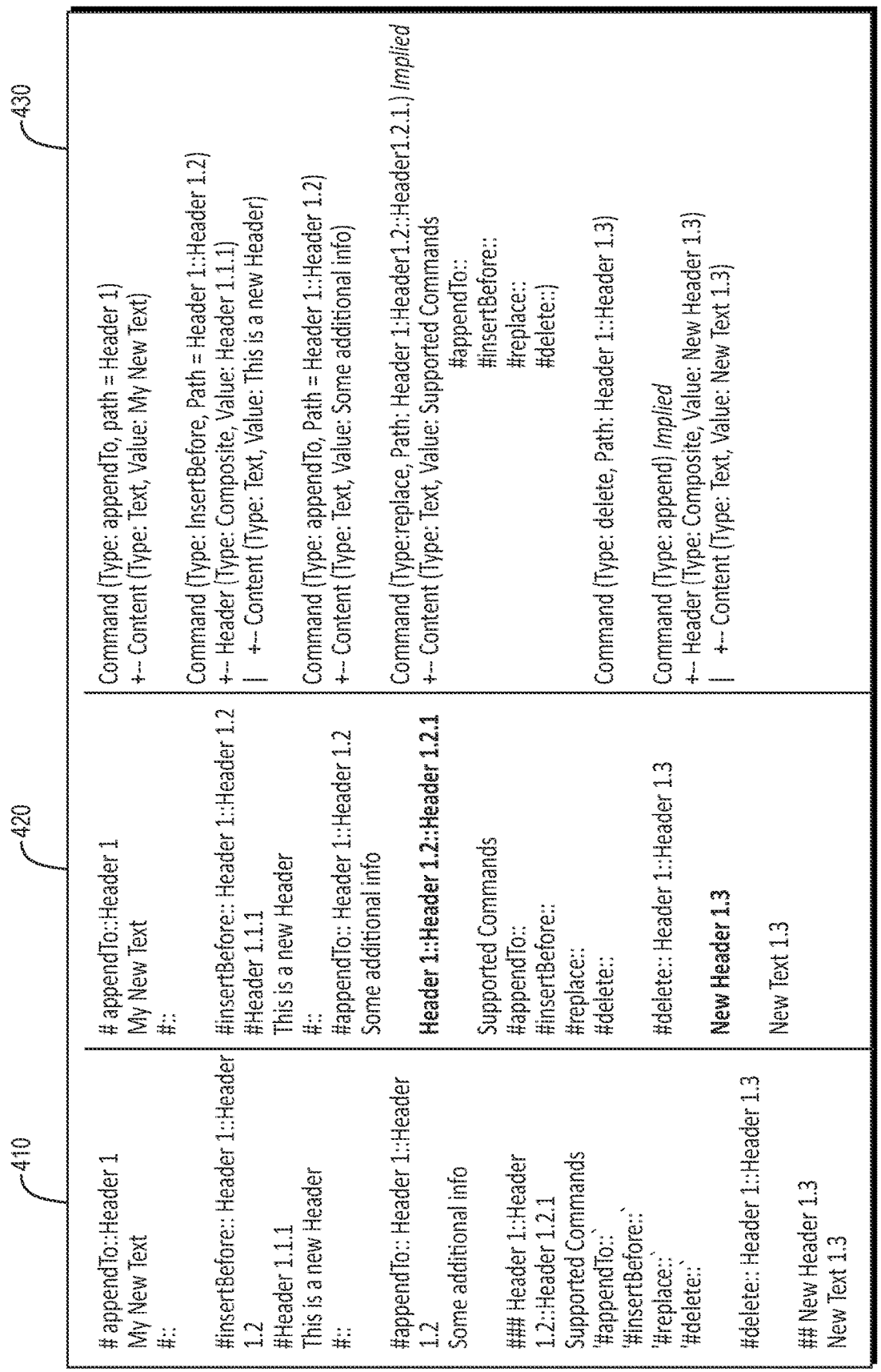
FIG. 4 is an example enhancement document, rendered view and second hierarchical graph that may be referred to as illustrations of various ones of the steps of FIG. 2.

Referring to FIG. 4, column 410 shows an example enhancement document that may be received by the markup language merge software process 140 as part of step 210. In this example, the enhancement document 162 includes special commands and standard markup language content. In some cases, markup language content may be interpreted as implied commands. The first command ("appendTo") specifies that content ("My New Text") should be appended to the end of a referenced section or subsection ("Header 1"). The second command ("insertBefore") specifies that content ("Header 1.1.1. This is a new Header") should be inserted before a reference section or subsection ("Header 1,2"). The third command (another "appendTo") specifies that additional content ("Some additional info") should be appended to the end of a referenced section or subsection ("Header 1.2"). Markup language content may be interpreted as a fourth command (an implied "replace") that specifies that content ("Text 1.2.1") of the referenced section or subsection ("Header 1.2.1") should be replaced with new content ("Supported Commands #appendTo::#insertBefore::#replace::#delete::"). The Fifth command ("delete") specifies that the referenced section or subsection ("Header 1.3") should be deleted. Finally, markup language content may be interpreted as a sixth command (an implied "appendTo") to specify that content ("New Header 1.3 New Text 1.3") should be appended to the end of the document. Column 420 shows how the example enhancement document from column 410 would look when rendered (e.g., displayed on a display screen or printed on a printer).

At step 220, the markup language merge software process 140 converts the markup language document 152 into a first hierarchical graph in which each section of the markup language document is arranged as a parent of any subsections of the respective section. The markup language merge software process 140 may employ a file parser (e.g., a custom Markdown file parser). The first hierarchical graph may be a simplified graph, here one that just includes sections and subsections (and the headers and text thereof).

Referring to FIG. 3, column 330 shows an example first hierarchical graph that may be produced by the file parser of the markup language merge software process 140 as part of step 220. A section (having "Header 1") is the parent of multiple subsections (having "Header 1.1", "Header 1.2", and "Header 1.3"). Another section (having "Header 1.2") is the parent of a single subsection (having "Headers 1.2.1").

At step 230, the markup language merge software process 140 converts the enhancement document 162 into a second hierarchical graph. The second hierarchical graph may be arranged so that at least some commands are arranged as a parent of an updated section or subsection, or text thereof. The markup language merge software process 140 may again employ the file parser (e.g., the custom Markdown file parser). The second hierarchical graph may again be a simplified graph, here one that just includes commands (and the references and updated content thereof).

Referring to FIG. 4, column 430 shows a second hierarchical graph that may be produced by the file parser of the markup language merge software process 140 as part of step 230. The first command ("appendTo") is associated with updated content ("My New Text"). The second command ("insertBefore") and third command (another "appendTo") are combined and associated with updated content (having "Header 1.1.1 This is a new Header" and "Some additional info"). The fourth command (implied "replace") is associated with updated content ("Supported Commands #appendTo::#insertBefore::#replace::#delete::"). Likewise the sixth command (implied "appendTo") is associated with updated content ("New Header 1.3 New Text 1.3").

At step 240, the markup language merge software process 140 merges the first hierarchical graph and the second hierarchical graph, including applying commands of the second hierarchical graph to the first hierarchical graph, to produce an updated hierarchical graph. To apply the commands the markup language merge software process 140 may undertake a number of sub-steps. First, it may search in each of the commands for a reference indicating a corresponding section or subsection of the markup language document. If no respective reference is found, it may log a missing reference error and simply append content of the command to an end portion of the updated hierarchical graph. If a respective reference is found, it may update the referenced section or subsection in the first hierarchical graph based on the command. The nature of the update may depend on the command. If the command is an insert before command ("insertBefore"), it may insert content of the enhancement document 162 before the referenced section or subsection in the first hierarchical graph to produce the updated hierarchical graph. If the command is a replace command ("replace") it may replace content of the referenced section or subsection in the first hierarchical graph with content of the enhancement document 162 to produce the updated hierarchical graph. If the command is a delete command ("delete") it may delete the corresponding section or subsection in the first hierarchical graph to produce the updated hierarchical graph.

At step 250, the markup language merge software process 140 outputs an updated markup language document 172 based on the updated hierarchical graph. The outputting may involve storing each of the nodes of the updated markup language document 172 into the updated markup language document 172 in a target folder 170. It may also involve rendering the updated markup language document 172 by displaying it on a display screen or printing it on a printer.

Referring to FIG. 5, column 510 shows an example updated markup language document that may be produced in step 250. Column 520 shows how the example updated markup language document would look if rendered (e.g., displayed on a display screen or printed on a printer). Likewise, column 530 shows an example the updated hierarchical graph, incorporating the all updates described above in reference to FIG. 4, from which the example updated markup language document in column 510 may be produced.

After execution of step 250, the sequence of steps 200 of FIG. 2 may terminate. It should be understood that such steps 200 may provide various advantages over prior approaches to updating content of markup language documents. Among other things, the user (e.g., content author) may be freed from wading through large amounts of content to make desired updates, as the enhancement document 162 may be far more compact than the original markup language document 152. Further, repetition of operations each time the markup language document 152 changes (e.g., on every build) may be avoided, as the enhancement document 162 may simply be re-merged with the markup language document 152 if/when the markup language document changes.

It should be understood that various adaptations and modifications may be readily made to what is described above to suit various implementations and environments. While it is discussed above that many aspects of the techniques may be implemented by specific software modules executing on hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for updating content of a markup language document, comprising:
receiving, by a software process executing on one or more computing devices, the markup language document, wherein the markup language document is a document encoded with a set of symbols that instruct software how the markup language document should look when rendered on a computing device, the markup language document having one or more sections;
receiving, by the software process, a corresponding enhancement document that includes a plurality of commands executable by software which describe updates to the markup language document;
converting, by the software process, the markup language document into a first hierarchical graph in which each section of the markup language document is arranged as a parent of any subsections of the respective section;
converting, by the software process, the enhancement document into a second hierarchical graph including one or more of the plurality of commands which describe updates to the markup language document;
merging, by the software process, the first hierarchical graph and the second hierarchical graph, the merging to apply commands of the second hierarchical graph to the first hierarchical graph to produce an updated hierarchical graph; and outputting, by the software process, an updated markup language document based on the updated hierarchical graph.

2. The method of claim 1, wherein the markup language document is a Markdown document and the updated markup language document is an updated Markdown document.

3. The method of claim 1, wherein the markup language document is an auto-generated markup language document, the enhancement document is a user-content document, and the plurality of commands which describe updates to the markup language document describe user-specified updates to the auto-generated markup language document.

4. The method of claim 3, wherein the auto-generated markup language document is application program interface (API) documentation auto-generated from an API definition or API code, and the sections and subsections describe available endpoints and operations on each endpoint, parameters for input and output of each operation and/or authentication methods.

5. The method of claim 1, further comprising:
searching in each of the one or more commands which describe updates to the markup language document for a reference indicating a corresponding section or subsection of the markup language document; and
in response to finding a respective reference, updating the referenced section or subsection in the first hierarchical graph based on the command.

6. The method of claim 5, further comprising:
in response to not finding a respective reference, appending content of the command to an end portion of the first hierarchical graph.

7. The method of claim 1, wherein the plurality of commands which describe updates to the markup language document include an append to command that when applied appends content of the enhancement document to a corresponding section or subsection in the first hierarchical graph to produce the updated hierarchical graph.

8. The method of claim 1, wherein the one or more commands which describe updates to the markup language document include an insert before command that when applied inserts content of the enhancement document before a corresponding section or subsection in the first hierarchical graph to produce the updated hierarchical graph.

9. The method of claim 1, wherein the one or more commands which describe updates to the markup language document include a delete command that when applied deletes a corresponding section or subsection in the first hierarchical graph to produce the updated hierarchical graph.

10. The method of claim 1, wherein the one or more commands which describe updates to the markup language document include a replace command that when applied replaces content of a corresponding section or subsection in the first hierarchical graph with content of the enhancement document to produce the updated hierarchical graph.

11. A method for updating content of a markup language document, comprising:
receiving, by a software process executing on one or more computing devices, the markup language document, wherein the markup language document is a document encoded with a set of symbols that instruct software how the markup language document should look when rendered on a computing device, the markup language document having one or more sections;
receiving, by the software process, a corresponding enhancement document that includes a plurality of commands executable by software which describe updates to the markup language document;
converting, by the software process, the markup language document into a first hierarchical graph;
converting, by the software process, the enhancement document into a second hierarchical graph including one or more of the plurality of commands which describe updates to the markup language document;
merging, by the software process, the first hierarchical graph and the second hierarchical graph; and
outputting, by the software process, an updated markup language document based on a result of the merging.

12. The method of claim 11, wherein the markup language document is a Markdown document and the updated markup language document is an updated Markdown document.

13. The method of claim 11, wherein the markup language document is an auto-generated markup language document, the enhancement document is a user-content document, and the plurality of commands describe user-specified changes to auto-generated content.

14. The method of claim 11, further comprising:
searching in each of the one or more commands which describe updates to the markup language document for a reference indicating a corresponding section or subsection of the markup language document;
in response to finding a respective reference, updating the referenced section or subsection in the first hierarchical graph based on the command; and
in response to not finding a respective reference, appending content of the command to an end portion of the first hierarchical graph.

15. A non-transitory electronic device readable medium having instructions stored thereon that when executed on one or more processors of one or more electronic devices are operable to:
receive an auto-generated markup language document, wherein the markup language document is a document encoded with a set of symbols that instruct software how the auto-generated markup language document should look when rendered on a computing device, the markup language document having one or more sections;
receive a corresponding user-content document that includes a plurality of commands describing user-specified updates to the auto-generated markup language document;
convert the auto-generated markup language document into a first hierarchical graph in which each section of the auto-generated markup language document is arranged as a parent of any subsections of the respective section;
convert the user-content document into a second hierarchical graph which includes one or more of the plurality of commands which describe updates to the auto-generated markup language document;
apply commands of the second hierarchical graph to the first hierarchical graph to produce an updated hierarchical graph; and
output an updated markup language document based on the updated hierarchical graph.

16. The non-transitory electronic device readable medium of claim 15, wherein the auto-generated markup language document is an auto-generated Markdown document and the updated markup language document is an updated Markdown document.

17. The non-transitory electronic device readable medium of claim 15, wherein the auto-generated markup language document is application program interface (API) documentation auto-generated from an API definition or API code, and the sections and subsections describe available endpoints and operations on each endpoint, parameters for input and output of each operation and/or authentication methods.

18. The non-transitory electronic device readable medium of claim 15, wherein the instructions when executed are further operable to:
   search in each of the one or more commands which describe updates to the auto-generated markup language document for a reference indicating a corresponding section or subsection of the auto-generated markup language document;
   in response to finding a respective reference, update the referenced section or subsection in the first hierarchical graph based on the command;
   in response to not finding a respective reference, append content of the command to an end portion of the first hierarchical graph.

19. The non-transitory electronic device readable medium of claim 15, wherein the one or more commands which describe updates to the auto-generated markup language document include an append to command that when applied appends content of the enhancement document to a corresponding section or subsection in the first hierarchical graph to produce the updated hierarchical graph, or an insert before command that when applied inserts content of the enhancement document before a corresponding section or subsection in the first hierarchical graph to produce the updated hierarchical graph.

20. The non-transitory electronic device readable medium of claim 15, wherein the one or more commands which describe updates to the auto-generated markup language document include a delete command that when applied deletes a corresponding section or subsection of the auto-generated markup language document in the first hierarchical graph to produce the updated hierarchical graph or a replace command that when applied replaces content of a corresponding section or subsection in the first hierarchical graph with content of the enhancement document to produce the updated hierarchical graph.

* * * * *